United States Patent
Faris

(10) Patent No.: US 7,365,894 B2
(45) Date of Patent: Apr. 29, 2008

(54) ELECTRODE STRUCTURE INCLUDING TRANSPARENT ELECTRODE STRUCTURE, AND APPLICATIONS THEREOF

(75) Inventor: Sadeg M. Faris, Pleasantville, NY (US)

(73) Assignee: Reveo, Inc., Hawthorne, NY (US)

( * ) Notice: Subject to any disclaimer, the term of this patent is extended or adjusted under 35 U.S.C. 154(b) by 64 days.

(21) Appl. No.: 10/957,885

(22) Filed: Oct. 4, 2004

(65) Prior Publication Data

US 2005/0140665 A1    Jun. 30, 2005

Related U.S. Application Data

(60) Provisional application No. 60/508,358, filed on Oct. 3, 2003.

(51) Int. Cl.
*G02F 1/1343*    (2006.01)
(52) U.S. Cl. .................. 359/254; 359/266; 345/179; 349/12
(58) Field of Classification Search ........... 359/254, 359/266, 296, 265; 345/179; 349/12; 347/112
See application file for complete search history.

(56) References Cited

U.S. PATENT DOCUMENTS

| | | | |
|---|---|---|---|
| 3,982,320 A * | 9/1976 | Buchoff et al. | 29/883 |
| 4,639,720 A | 1/1987 | Rympalski et al. | |
| 4,820,170 A | 4/1989 | Redmond et al. | |
| 5,604,517 A | 2/1997 | Filo | |
| 5,838,889 A * | 11/1998 | Booker | 345/649 |
| 5,904,790 A * | 5/1999 | Sheridon | 156/83 |
| 6,333,754 B1 | 12/2001 | Oba et al. | |
| 6,545,671 B1 * | 4/2003 | Silverman | 345/179 |
| 6,768,889 B2 * | 7/2004 | Ikegawa | 399/130 |
| 2001/0029119 A1 | 10/2001 | Chung | |
| 2002/0131151 A1* | 9/2002 | Engler et al. | 359/296 |

FOREIGN PATENT DOCUMENTS

WO    WO0125891 A1    4/2001

OTHER PUBLICATIONS

PCT/US2004/032484 PCT/ISA/210.
PCT/US2004/032484 PCT/ISA/237.

* cited by examiner

*Primary Examiner*—Hung Dang
*Assistant Examiner*—Joseph Martinez
(74) *Attorney, Agent, or Firm*—Ralph J. Crispino

(57) ABSTRACT

Electrode structures including transparent electrode structures, in particular self supporting electrode structures, are described herein. Further, applications of the herein novel electrode structures are provided, including electronic writing tablets, electronic paper and fabrication methods for electronic writing tablets and electronic paper. The electrode structure may be transparent and self-supporting, thereby providing a novel electrode structure as compared to conventional transparent electrodes.

9 Claims, 10 Drawing Sheets

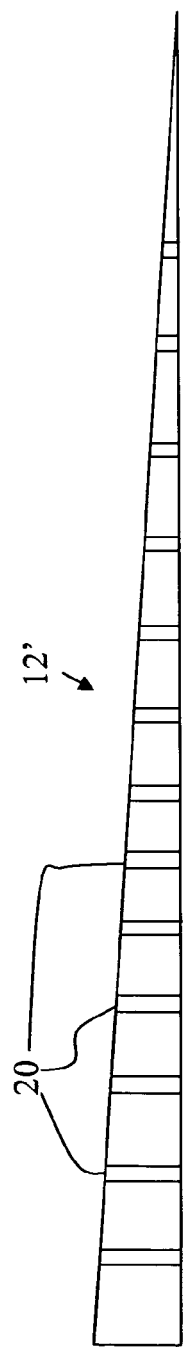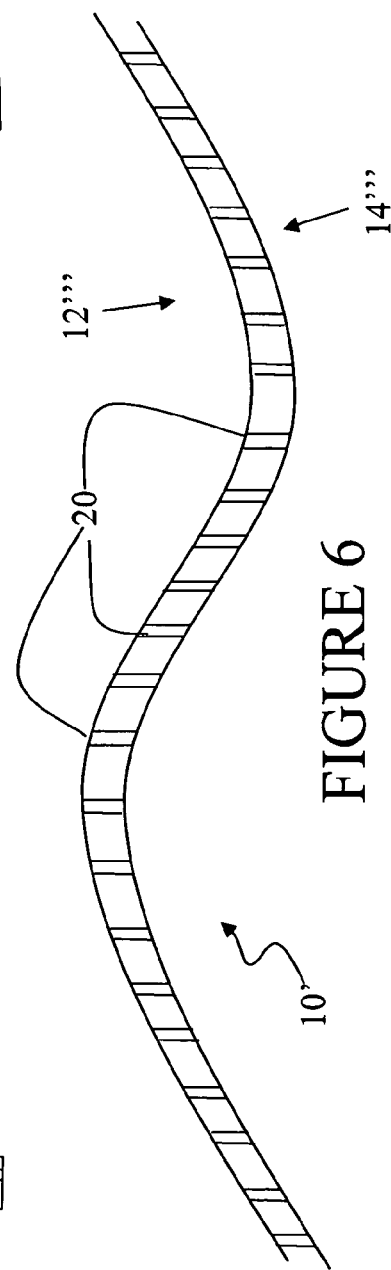

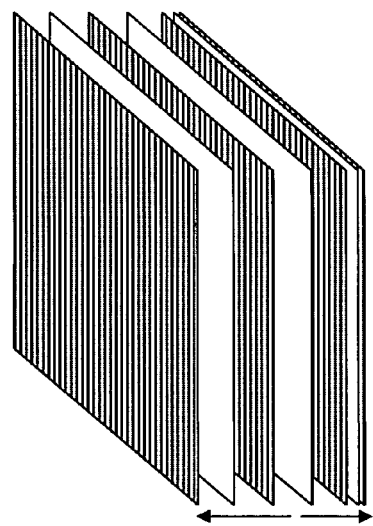
FIGURE 7A
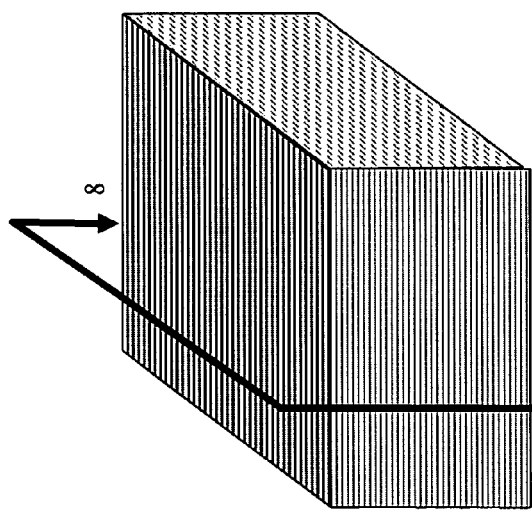
FIGURE 7B
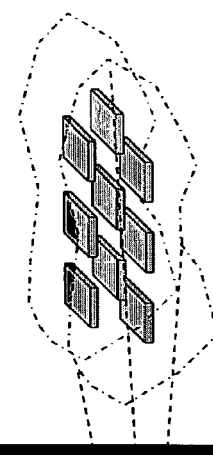
FIGURE 8
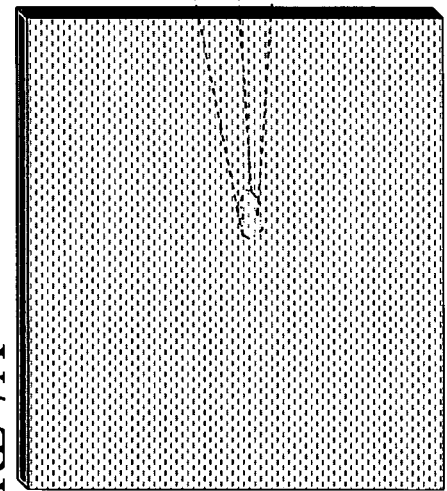
8-8

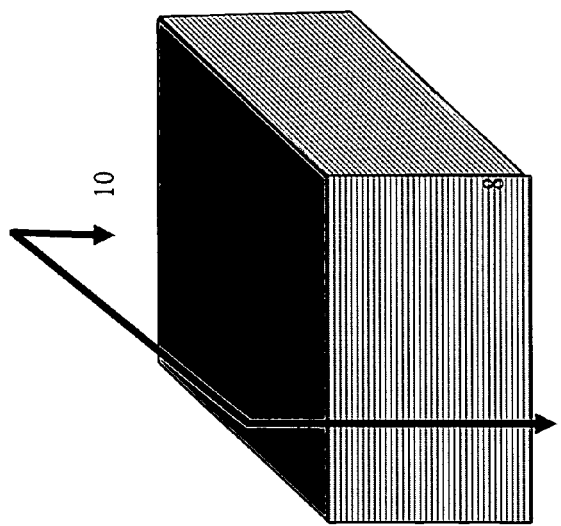
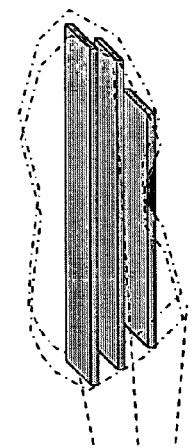
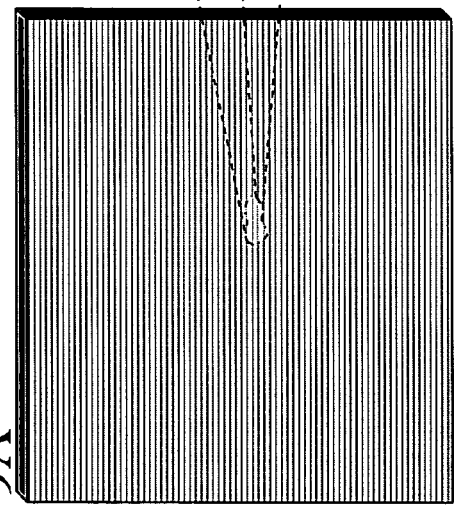
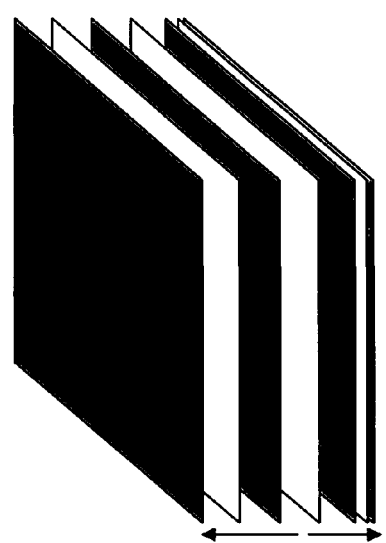
FIGURE 9B
FIGURE 10
FIGURE 9A

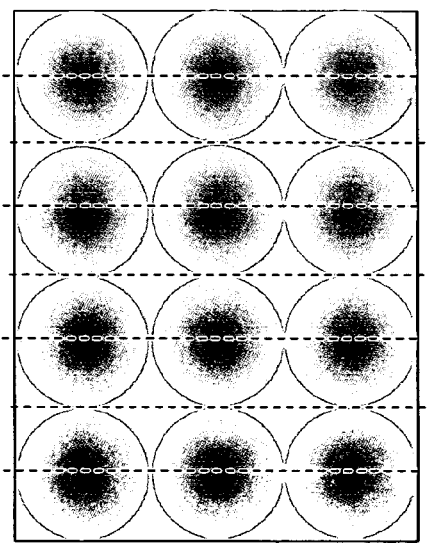
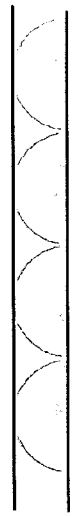
FIGURE 13A
FIGURE 13B
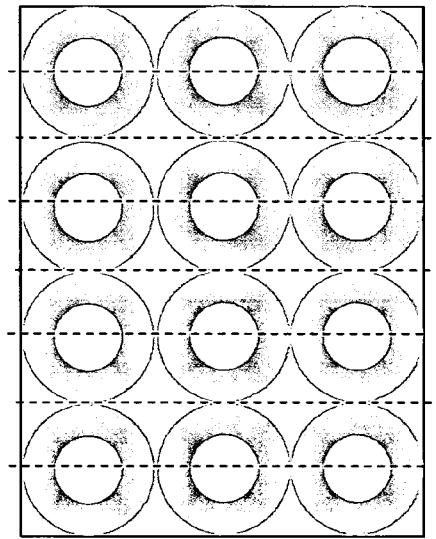
FIGURE 14A
FIGURE 14B

ELECTRODE STRUCTURE INCLUDING TRANSPARENT ELECTRODE STRUCTURE, AND APPLICATIONS THEREOF

CROSS-REFERENCE TO RELATED APPLICATIONS

This application claims the benefit under 35 U.S.C. §119 (e) of U.S. Provisional Patent Application Ser. No. 60/508,358 filed on Oct. 3, 2003, entitled "Electronic Writing Sheets and Methods of Manufacturing Electronic Writing Sheets," which is incorporated by reference herein.

BACKGROUND OF THE INVENTION

1. Field of the Invention

The present invention relates to electrode structures including transparent electrode structures, in particular self supporting electrode structures. Further, applications of the herein novel electrode structures are provided, including electronic writing tablets, electronic paper and fabrication methods for electronic writing tablets and electronic paper.

2. Description of the Related Art

Countless electrode structures have been developed and applied over time. However, transparent electrodes have been limited in their development primarily due to material limitations. Transparent electrode materials have been primarily based on tin oxide, indium-tin-oxide, zinc oxide, or conductive polymers. However, such materials are known to be transparent conductors only if certain special conditions are met in their preparation, and if their thicknesses are less than 5000 Angstroms. Thus, bulk glass or plastic substrates are required to impart mechanical strength.

For the past decades, much widespread discussion, publicity and speculation has been directed towards a paperless society. Benefits of such a society include minimization of deforesting and refuse. Further, paper processing involves usage of many environmentally harsh chemicals, generally to bleach the paper.

Additionally, although ubiquitous for hundreds of years, newspapers themselves have many drawbacks. The inks used commonly rub off, making reading a newspaper a messy event due to ink transfer from the paper to individuals' hands.

Accordingly, to this end, there have been proposed various "paper-like" displays, which generally have stylus input and display functionality.

Liquid crystal material has been used, for example, as is known in conventional LCDs having pen-based input (e.g., see T. Ogawa et al., "The Trends of reflective LCDs for future electronic paper", SID '98 Digest, p. 217) However, such conventional LCD based are generally bulky and require relatively high operating voltage to overcome the resistance imparted by conventional LCD display protective substrates.

There has recently been a number of proposed soltuions using MEM (microelectromechanical) devices for display applications. Two types of MEM based direct view displays have been proposed. In one (See e.g., E. Stem, "Large-area micromechanical flat-panel display", SID 97 Digest, p. 230), an array of passively addressed bistable transparent beams are used to control the release of light trapped by total internal reflection. This device, however, requires a complicated backlighting system, and is not suitable for portable electronic writing tablets. Further, protective substrates increase bulk and requisite operating voltage.

A second type uses micromachined deformable optical cavities whose reflected color changes with voltage. (See e.g., M. W. Miles, "A new reflective FPD technology using interferrometric modulation", SID 97 Digest (1997) p.71). Again, however, protective substrates increase bulk and requisite operating voltage.

Other types of displays, referred to as "electroscopic displays", use an electroscopic fluid display where a plate or grid which is reflective and movable is sealed with a glass plate and filled with a nonconducting colored solvent. If the penetration depth of the incident light in the solvent is much smaller than the cell thickness, than when the reflective grid is located near the bottom plate, the grid will not be visible and the solvent color will be visible. However, when the reflective grid is attracted to the front side, the reflective grid will be visible and the cell will appear white. Such systems are described, for example, in Te Velde et al., "A family of electroscopic displays", Society of Information Display 1980 technical digest, p.116-117 and the following U.S. Pat. Nos. 4,178,077, 4,519,676, 4,729,636.). These systems require complex structures of springy capacitors or triodes which must control physical movement of the grid.

Also proposed are displays integrating addressing electronics on the display itself to reduce cost and improve yield. For an 8½ by 11 inch display, approximately 1,275 gate line and about 1,650 data line connections and driver chip outputs are needed. These systems are described by J. L. Sanford et al. in "Silicon light valve array chip for high resolution reflective liquid crystal projection displays", IBM J. Res. Develop., Vol. 42 No. 3/4, May/Jun. 1998, pp.347-358.

Flexible electronic paper systems have also been proposed. Prominent in the endeavor to develop flexible electronic paper systems are E Ink and Gyricon.

E Ink Corporation (Cambridge, Mass.) provides an "electronic ink" system whereby millions of tiny microcapsules, about 100 microns in diameter, are provided between substrates. The microcapsules contain positively charged white particles and negatively charged black particles suspended in a clear fluid. When a negative electric field is applied, the white particles move to the top of the microcapsule where they become visible to the user, and an opposite electric field pulls the black particles to the bottom of the microcapsules where they are hidden. The process is reversible whereby the black particles appear at the top of the capsule.

Gyricon LLC (Ann Arbor, Mich.) teaches a reusable display material known as SmartPaper™ that is electrically writable and erasable. This system is disclosed, e.g., in U.S. Pat. No. 4,126,854 entitled "Twisting ball panel display" to Nicholas Sheridon. The technology uses an array of solid beads about 100 micron diameter or smaller, with one hemisphere of each bead one color (e.g. white) and the other a different color (e.g. black). The beads are embedded in a flexible plastic sheet in small cavities surrounded by a liquid. Each bead carries an electrical charge. Upon application of an external electric field the bead rotates when adhesive forces between each bead and the cavity wall are overcome by a requisite electrical threshold. This displays an image electrically on the material, and is erasable with another transmission. Electrical signals can be applied through fixed surface electrodes or a moving stylus.

An ideal electronic paper media desirably has the following characteristics:
  physical resemblance to conventional paper, in the form of sheets, notebooks or tablets with multiple pages, poster boards, or other known paper types;

inexpensive to manufacture, making electronic paper ubiquitous;

flexibility such that pages of electronic paper may readily be turned, similar to pages in a notebook;

low operating voltage, thereby decreasing weight and bulk in portable systems by reducing battery or other power source weight and bulk.

As discussed above, no existing liquid crystal based systems meet these ideal systems. They typically require many discreet and precise manufacturing steps for acceptable electronic writing tablets, increasing cost and limiting the market to high end users. Many of the above described systems are limited by bulk and rigidity. A major problem among all or most convention electronic paper or tablet systems is that the transparent conductive materials are not self supporting, and require substantial mechanical support. Tin oxide, indium-tin-oxide, zinc oxide, or conductive polymers are known to be transparent conductors if certain special conditions are met in their preparation and if their thicknesses are less than 5000 Angstroms. Thus, bulk glass or plastic substrates are required to impart mechanical strength. This adds, in addition to bulk and weight, resistance, increasing requisite operating voltage, and hence creating a need for expensive and bulky driver systems. Further, these substrates decrease resolution, generally a function of glass or plastic thickness. They do not resemble regular paper. Conventional electronic paper systems are typically bulky, expensive to manufacture, high voltage requiring expensive drivers, etc.

SUMMARY OF THE INVENTION

Electrode structures including transparent electrode structures, in particular self supporting electrode structures, are described herein. Further, applications of the herein novel electrode structures are provided, including electronic writing tablets, electronic paper and fabrication methods for electronic writing tablets and electronic paper. The electrode structure may be transparent and self-supporting, thereby providing a novel electrode structure as compared to conventional transparent electrodes.

An inventive electrode component is provided, in the form of a plate or a layer that is self supporting yet conducive of electricity and transparent to light, or otherwise having desired optical properties (e.g., formed of a particular color, translucent, etc.). No conventional teachings describe such a component. Tin oxide, indium-tin-oxide, zinc oxide, or conductive polymers are known to be transparent conductors if certain special conditions are met in their preparation and if their thicknesses are less than 5000 Angstroms. The herein described transparent conductor has thicknesses on the order of at least 100 times greater, endowing it with the stiffness and toughness necessary for the proposed electronic paper.

Therefore, an object of the present invention is to self supporting electrodes, particularly self supporting transparent electrodes.

Further, applications are provided, including electronic writing tablets that may be fabricated in an efficient and economical manner.

Further, an object of the present invention is to provide electronic writing tablets in a configuration that capable of very thin dimensions.

Further, an object of the present invention is to provide electronic writing tablets in a configuration that is mechanically flexible.

Another object of this invention to describe a method of manufacturing electronic paper (epaper) having characteristics approach those of an ideal ePaper, including:

comparably greater physical resemblance to conventional paper as compared to conventional electronic paper systems or tablets, in the form of sheets, notebooks or tablets with multiple pages, poster boards, or other known paper types;

relatively inexpensive to manufacture, making electronic paper ubiquitous;

flexibility such that pages of electronic paper may readily be turned, similar to pages in a notebook;

relatively low operating voltage, thereby decreasing weight and bulk in portable systems by reducing battery or other power source weight and bulk.

A further object of the present invention is to provide a method of manufacturing a transparent electrode reducing the reliance on mechanical support substrates.

An electronic writing tablets includes a substrate and an array of electrode conductors formed through the substrate, a liquid crystal material adjacent to a surface of the substrate, and an electrode in electrical contact with the liquid crystal material, whereby the array of electrode conductors are electrically addressable on the exposed surface of the substrate with an electrode pen. Accordingly, when the pen is stroked across plural electrode conductors on the exposed surface, a voltage is applied at that region in the liquid crystal material causing a change in optical properties.

BRIEF DESCRIPTION OF THE DRAWINGS

FIGS. 4-6 show alternative configurations of the mixed insulative/conductive body according to the invention herein;

FIGS. 7A, 7B and 8 depict steps of one method of making a mixed insulative/conductive body according to the invention herein;

FIGS. 9A, 9B and 10 depict steps of another method of making a mixed insulative/conductive body according to the invention herein;

FIGS. 13A and 13B show another alternative conductive portion configuration of the mixed insulative/conductive body according to the invention herein;

FIGS. 14A and 14B show still another alternative conductive portion configuration of the mixed insulative/conductive body according to the invention herein;

DETAILED DESCRIPTION

Figure 1:
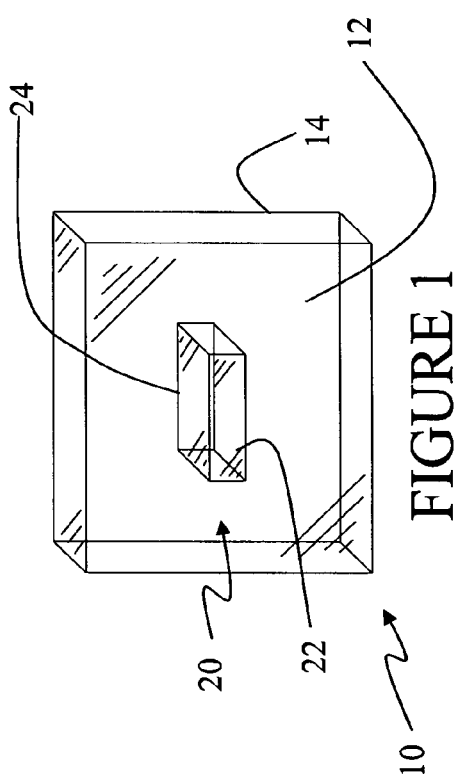
FIGS. 1 and 2 is a general view of a mixed insulative/conductive body according to the invention herein.
Figure 2:
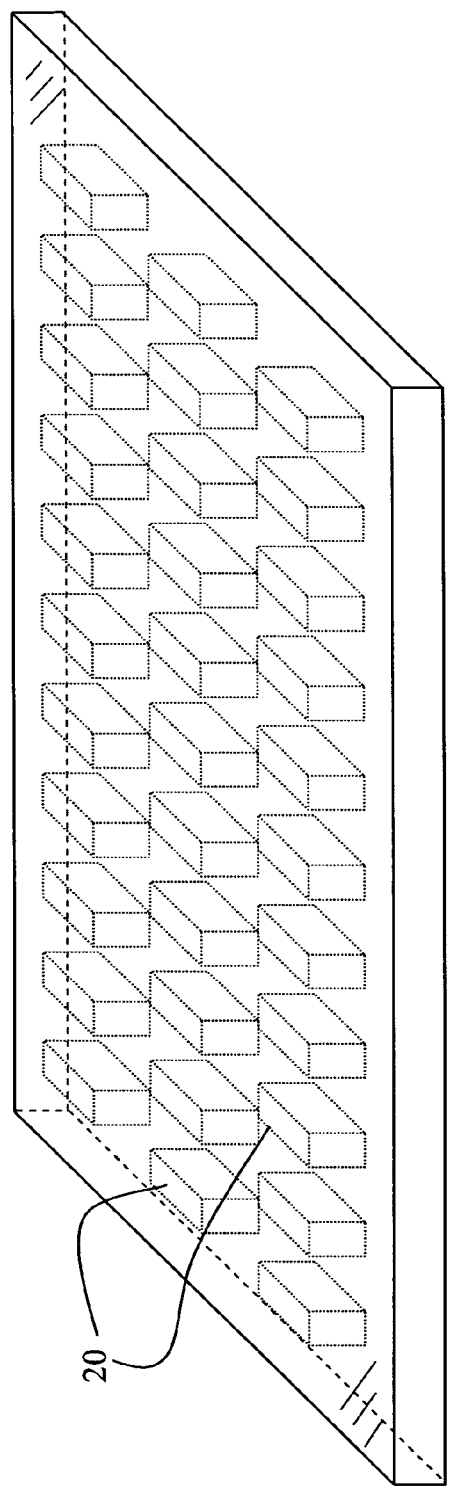

Referring now to FIG. 1, a mixed conductive-insulative body 10 includes a conductor element 20 integral therein. The body 10 generally includes a first surface 12 and a second surface 14. The conductor element 20 generally includes at least a first end 22 and a second end 24. The first end 22 is exposed (or readily exposable) at the first surface 12 of the body 10, and the second end 24 is exposed (or readily exposable) at the second surface 14 of the body 10. FIG. 2 shows a body 10 including plural elements 20.

Figure 3:
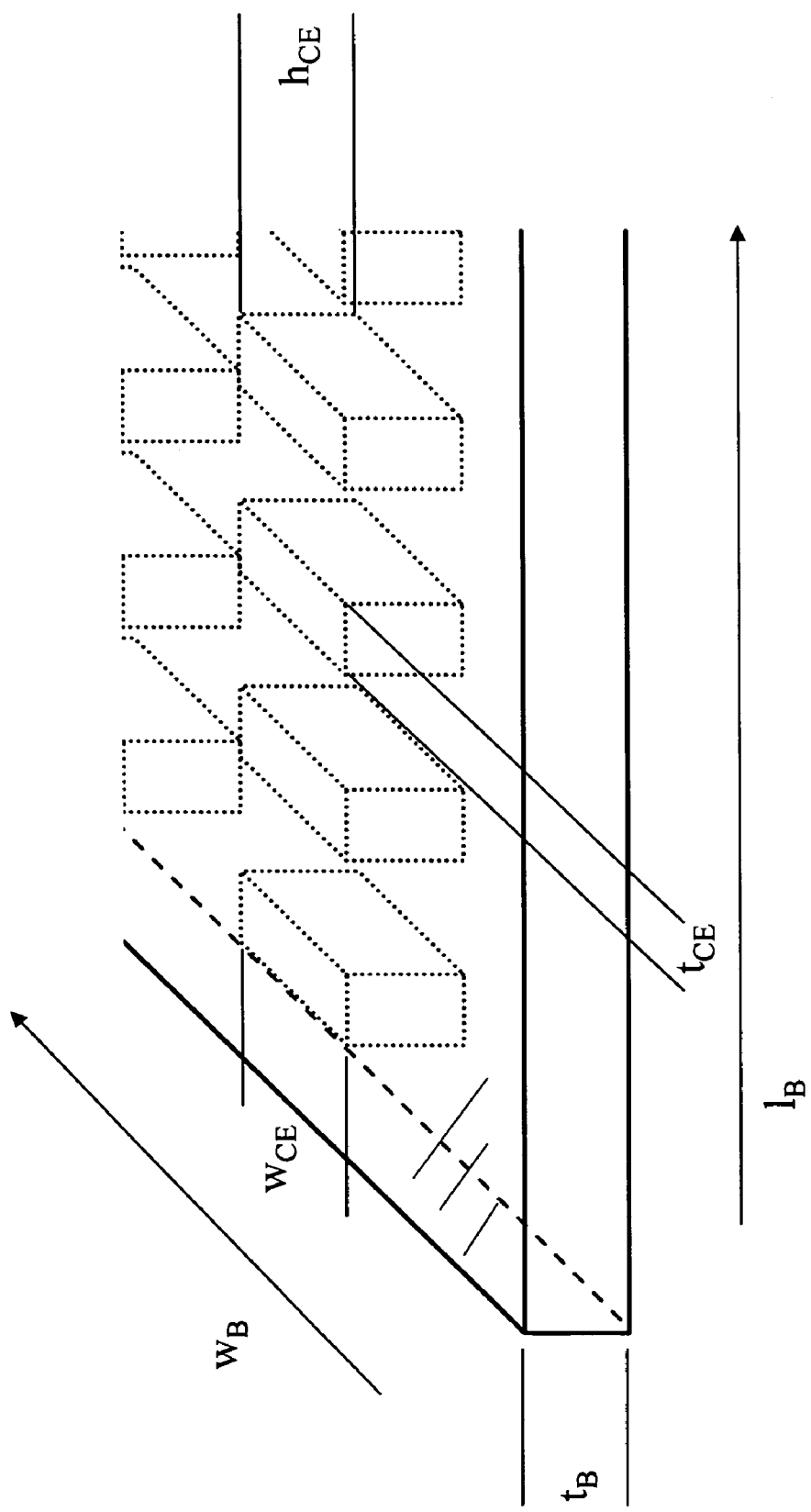
FIG. 3 is an enlarged view of a portion of a mixed insulative/conductive body according to the invention herein.

Referring to FIG. 3, the mixed conductive-insulative body 10 is characterized by various dimensions, including: width and length of the body $w_B$ and $l_B$; thickness of the body $t_B$; thickness and width of the conductive element $t_{CE}$ and $w_{CE}$; and height of the conductive element $h_{CE}$. In certain embodiments, e.g., wherein the ends of the conductive elements are flush with the surfaces of the body, $h_{CE} \approx t_B$. In general, the width and length of the body $w_B$ and $l_B$ define major surfaces of the body 10 having an area dimension S. The ratio of S to $t_B$ is generally at least 2:1, preferably at least 5:1, more preferably at least 10:1. In certain embodiments, the ratio of S to $t_B$ is generally may be at least 1000:1, at least 10000:1, or even at least 100000:1.

The dimensions of the body 10 are preferably such that the body is self supporting—that is, the need for a backing material or substrate that exists with conventional transparent electrodes such as 5000 angstrom thick indium tin oxide is obviated. The body may have a thickness $t_B$ of greater than about 0.1 millimeters, 0.5 millimeters, 1 millimeter, 1 centimeter, 5 centimeters, or even 10 centimeters or greater in thickness.

Although shown in FIG. 1 as a generally prismatic shape with the first surface 12 and the second surface 14 being substantially parallel, FIGS. 4-6 show alternate cross sectional views of a body 10', 10" and 10''', respectively, with first surfaces 12', 12" and 12''', respectively, and second surfaces 14', 14" and 14''', respectively.

Referring now to FIGS. 7A and 7B, exemplary steps for manufacturing the contact layer having the plural conductors therethrough are shown. A plurality of conductor striped layers are stacked, as shown in FIG. 7A. The conductors may be striped on any suitable substrate by printing, depositing, laminating, or any suitable method. The substrate may be provided with notches to maintain smooth surfaces more suitable for stacking, either on the surface having the conductors (wherein the conductors is formed or laminated in the notches) or on the surface not having the conductors (wherein the conductors from the layer underneath reside in the notches). Further, the substrates may be provided in partially melted or soft-state, thereby facilitating stacking and minimizing gaps.

The conductor may be any suitable metallic or conducting polymer material. One preferred material that is widely used in the display industry for providing transparent electrodes is indium tin oxide. However, other conductors, such as tin, tin oxide, copper, gold, silver, platinum, palladium, conductive polymers, or other suitable electrically conductive materials may be utilized.

The substrate may be any suitable non-conductive material suitable to support the conductive stripes. For example, polyvinyl alcohol (PVA), cellulose (e.g., nitrocellulose, cellulose acetate, and the like), polyethylene, polyamide (e.g., nylon), polyethylene oxide (PEO), other polyethylene materials, or the like may be used as the substrate. The substrate may be optically clear, or translucent, depending on the desired use of the mixed conductive/insulative body 10.

The stack of conductor striped layers are then sliced along line 8-8, as shown in FIG. 7B, into thin layers, generally shown orthogonal to the original stacking plane. FIG. 8 shows a sliced layer, and details the conductor portions extending through the thickness of the contact layer having the plural conductors therethrough. The layers may be sliced to any desired thickness, although as is apparent from the herein description, very thin layers may be sliced from the stack of conductor striped layers. For example, slices may be formed on the order of a few microns in thickness. Further, since the conductive elements are structurally supported within the body, slices may be formed much thicker, on the order of a few to several millimeters, a few to several centimeters, or even greater depending on the desired application.

Note that the period of plural conductors, and the pattern formed therefrom, may be adjusted by varying the layers of striped conductors, offsetting the layers of striped conductors, or other suitable means.

Referring to FIGS. 9A, 9B and 10, another pattern of conductive elements is shown, whereby plural conductive elements extend across the face of a body. This is achieved by stacking alternating layers of insulative and conductive material (FIGS. 9A, 9B), and slicing along line 10-10 to provide the body having conductive elements therethrough.

Figure 11:
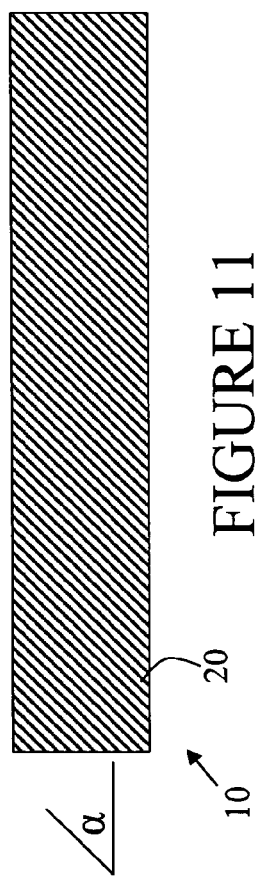
FIG. 11 shows another configuration for the mixed insulative/conductive body according to the invention herein.

Referring now to FIG. 11, although the steps of FIGS. 7-10 show the slicing occurring generally orthogonal to the stack, the slicing may be at an angle, thereby producing conductive elements 20 extending through the body 10 at an angle alpha.

Figure 12B:
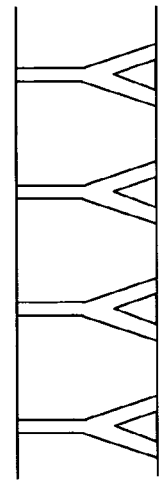
FIGS. 12A and 12B show an alternative conductive portion configuration of the mixed insulative/conductive body according to the invention herein.
Figure 12A:
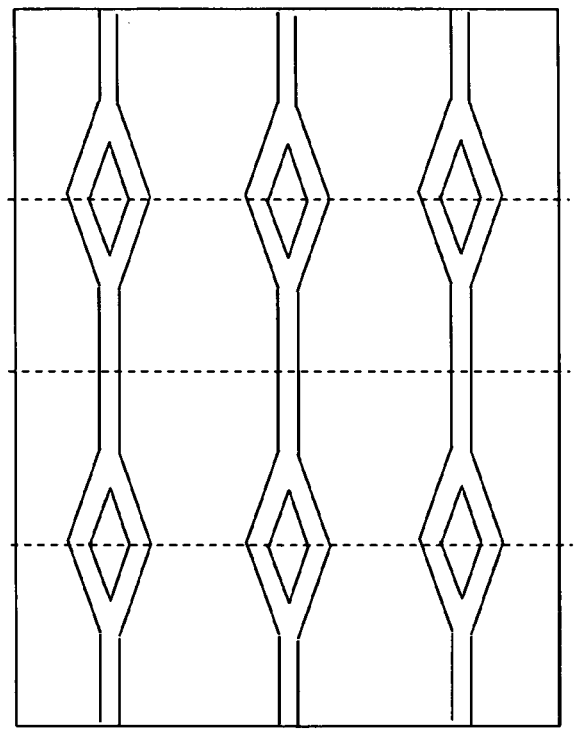

Referring now to FIG. 12A, the layers used to form the stack may have a conductive pattern formed thereon. For example, FIG. 12A shows a repeating pattern of a conductive stripe forming forks. Adjacent fork ends are aligned, and preferably formed continuously. When the slice line is at the adjacent fork ends, conductive elements are formed through the body having a first end with a single conductor at a first surface of the body and a second end with a pair of conductors at a second surface of the body.

Referring now to FIG. 13A, the layers used to form the stack may have an alternative conductive pattern formed thereon. For example, FIG. 13A shows a repeating pattern of a conductive circles. When the slice line is at the center diameter of the circles, conductive elements are formed generally having a semicircle shape through the body having a first end with a conductor at a first surface of the body (the conductor being the apex of the semicircle) and a second end with a conductor at a second surface of the body (the conductor being the diameter edge of the semicircle).

Referring now to FIG. 14A, the layers used to form the stack may have another alternative conductive pattern formed thereon. For example, FIG. 14A shows a repeating pattern of a conductive concentric circles. When the slice line is at the center diameters of the concentric circles, conductive elements are formed generally having a concentric semicircle shape through the body having a first end with a conductor at a first surface of the body (the conductor being the apex of the concentric semicircle) and a second end with a pair of conductors at a second surface of the body (the conductors being the diameter edges of the concentric semicircle).

Figure 15:
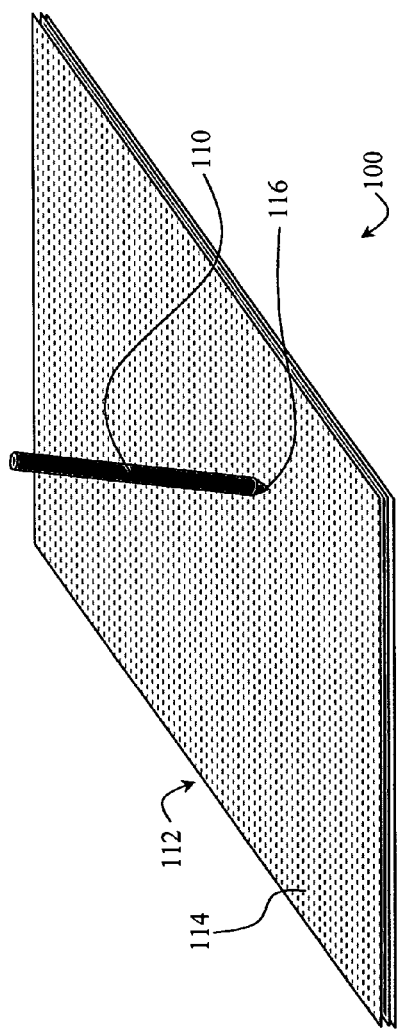
FIG. 15 shows an electronic sheet and an associated electrode pen.

The above described mixed conductive/insulative body, also referred to as a self supporting electrode, has various applications. In particular, where a transparent electrode is desired, or substantially transparent electrode, the herein self supporting electrode and manufacturing methods therefor may be used. For example, referring now to FIG. 15, an electronic writing sheet 100 is depicted, along with an associated pen 110. The sheet 100 has a writing surface 112 having plural conductors 114 arranged for selective electrical contact with a tip 116 of the electrode pen 110, as described herein.

Figure 16:
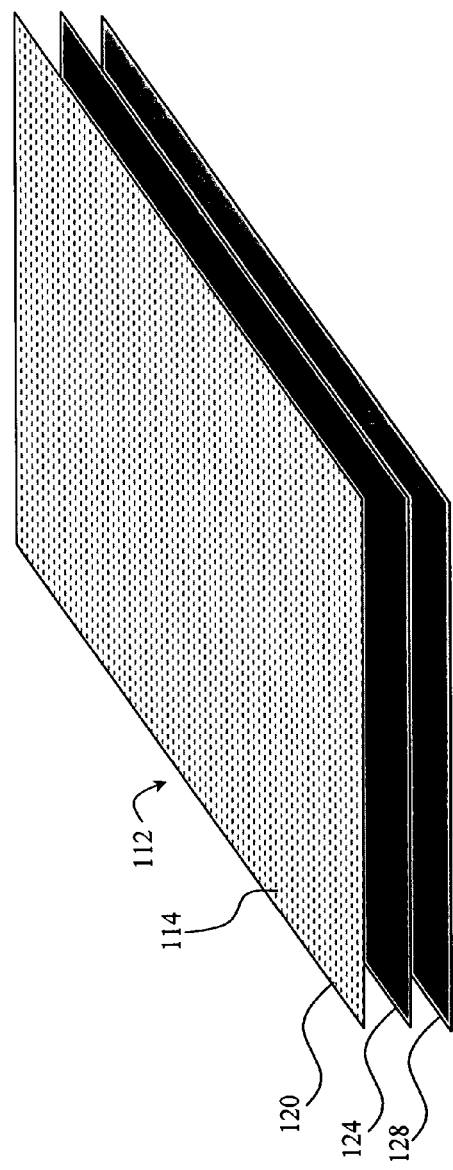
FIG. 16 is an exploded view of the electronic sheet of FIG. 15.

Referring now also to FIG. 16, the electronic sheet 100 is shown in an isometric exploded view showing multiple layers. The layers include: a contact layer 120 having the plural conductors 114 there through; a liquid crystal based layer 124; and an electrode layer 128.

As mentioned, the contact layer 120 includes plural conductors 114 integrally formed there through. The top surface 112 of the device may comprise the corresponding top layer of the layer 120, or optionally another surface layer maybe included that does not substantially interfere with operation of the electrode pen 110.

During operation, when the tip 116 of the electrode pen contacts one or more of the plural conductors 114, that/those conductors form active electrodes that, in conjunction with liquid crystal in the liquid crystal layer 124 and the electrode layer 128, form a liquid crystal cell. Due to applied voltage, either from the electrode pen 110, the electrode layer 128, or both, the optical state of corresponding liquid crystal material is altered, providing a "written" mark. Accordingly, a user may write notes, draw sketches, or activate software functions via pen strokes of the electrode pen 110.

The liquid crystal layer 124 may comprise any suitable liquid crystal material capable of having altered state via applied voltage. Materials such as certain nematic, smectic (e.g., ferroelectric), discotic; or cholesteric liquid crystals may be used. Such materials may be used alone or in mixtures such as polymer dispersed liquid crystal, polymer stabilized cholesteric texture, or other suitable combinations. Bistable materials are preferred for lower operating currents, however others may be used. Any suitable electrically activated material may be used, including but not limited to pCLC (Rochester University), electrophoretic materials (whereby vast numbers of tiny spheres in a viscous medium are rotated to create and destroy images); reverse emulsion electrophoretic materials; electrochromic; electrostatic; or other materials. Furthermore, in lieu of, or in combination with, switchable materials, activatable devices such as LEDs; OLEDs; MEMs; or other devices may be used. Other materials or systems may be used without departing from the scope of the herein inventions.

The electrode layer 128 may comprise any suitable conductive material as is known in the art of liquid crystal displays. Indium ink oxide and variation thereof are common and may be used, as well as any suitable substitute. The electrode layer 128 may optionally be pixelated.

The voltage source to activate the cells formed upon pen 110 contacting conductor(s) 114 may be derived from the electrode pen 110, the electrode layer 128, or both. For example, the electrode pen 110 may contain batteries, or may be connected by wires to a suitable power source. Alternatively, or in conjunction with the electrode pen 110, the electrode layer 120 may be powered by an integral battery or suitable power source.

The requisite power scheme depends, at least in part, on the choice of liquid crystal materials in layer 124. Where the material forms normal mode cells, an applied voltage is required at the regions of the electrode layer 128 associated with the pen stroked conductors 114. This may be accomplished by pixelated conductors for receiving applied voltage. Alternatively, in reverse mode cells, an applied voltage would be applied to a "blank" screen (the view of surface 112), and voltage removed to allow state change of the liquid crystal material to view "marks" at the pen stroked conductors 114. In either of these modes, voltage may also be applied via electrode pen 110 to activate (deactivate) the opposing regions of electrode layer 128.

In a preferred embodiment, liquid crystal material having bi stable properties are used, whereby voltage need only be applied to effectuate a state change. Thus, voltage may be applied via the pen 110, the electrode layer 128, or both. For example, the applied voltage from a powered electrode 110 may be sufficient to change the material state. Alternatively, when a voltage is detected from a powered pen 110, a corresponding voltage may be applied to a pixelated or non-pixelated electrode layer 128 to enhance state change capabilities.

In addition to the layers 120, 124 and 128 that are capable of selectively forming liquid crystal cells upon activation and/or power application from the electrode pen 110 other functional layers may optionally be provided to enhance viewability, operation, and/or functionality. These include, but are not limited to reflectors, polarizers, absorbers (e.g., for contrast background), support substrates (e.g., plastic or glass), memory circuits, sensors, logic circuits, power conditioning circuits, or combinations comprising at least one of the foregoing functional layers.

The electronic tablet 100 may be used as is, or may be integrated into another electronic device, such as a personal digital assistant, a portable computer, a telephone, or a wristwatch, for example. Alternatively, the electronic tablet 100 may also be integrated into portable objects such as conventional portfolios, briefcases, or even clothing. The electronic tablet 100 may further be integrated into automobiles and other vehicles, walls and furniture.

In one application, plural sheets each comprising an electronic tablet 100 are formed into a book, such as a electronic book may be used similar to a conventional notebook, allowing the user to conventionally refer to previously written notes (i.e. by flipping pages).

Figure 17:
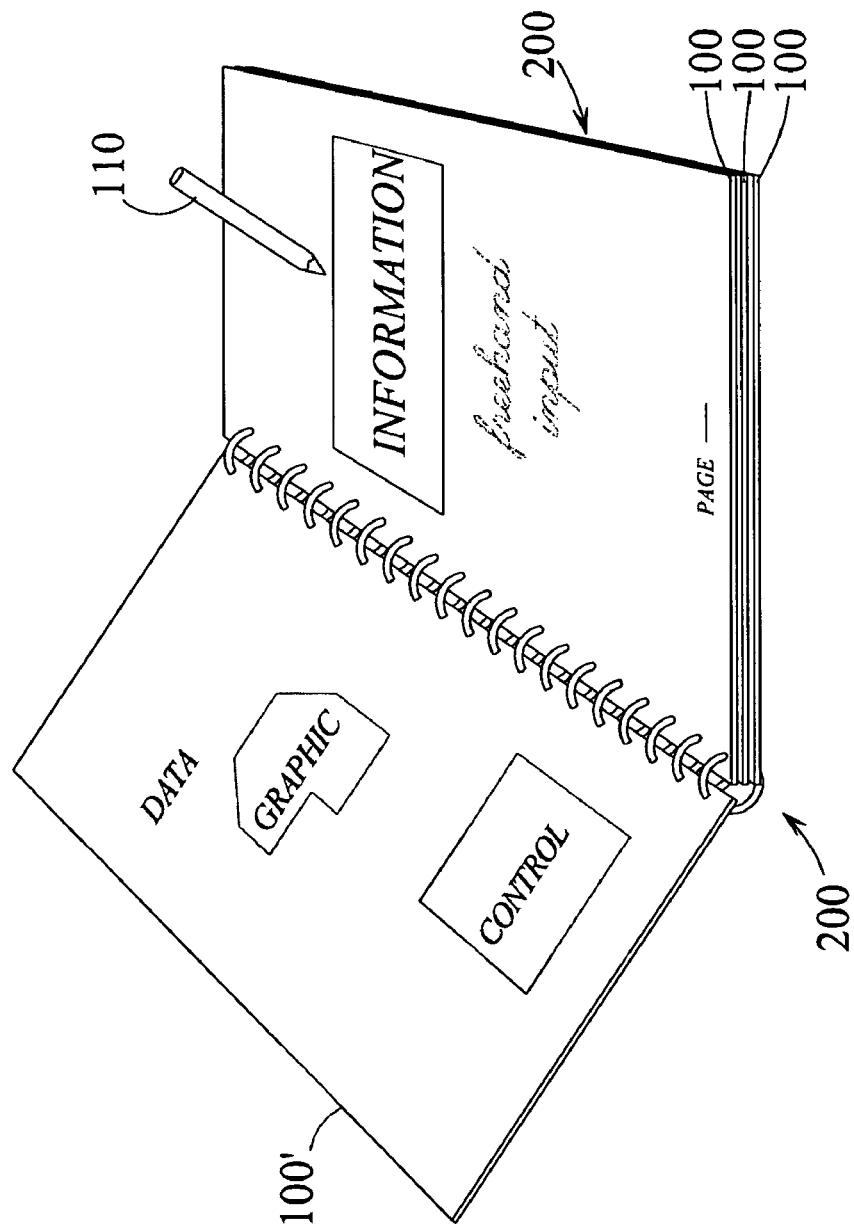
FIG. 17 shows an electronic notebook using electronic sheets according to the invention herein.

For example, referring now to FIG. 17, an example of an electronic notebook 200 is depicted. Notebook 200 is unlike conventional digital "notebooks", such as notebook computers or PDAs. A flaw of all existing digital "notebooks" is that they do not resemble a conventional paper notebook, i.e., having plural pages that the user can flip through to write information, graphics, etc., and/or retrieve (by manual page flipping) information from pages of the notebook. Since each page 100, comprising a sheet of electronic paper 100 described with respect to FIGS. 15-16, may be relatively stiff and substantially self-supporting, plural pages 100 may be "bound" and formed into a notebook 200.

It should be appreciated that both sides of a page of the notebook may be used for display and/or writing of information. Still referring to FIG. 17, sheet 1001 (on the left-hand side of the figure as shown) is an example of a part of a page having electronic paper 100 on two sides.

Various functionality can be attained with the notebook 200. For example, the notebook 200 may be used as a stand-alone device, containing integral therein various circuitries including but not limited to memory circuits, logic circuits, power conditioning devices, and the like. External memory, such as storage cards or disks, may also be supported in notebook 200. Further, notebook 200 may be configured to attach to a PC or other computer for uploading, downloading and/or synchronizing information. Each page (or side of a page) may be displayed the same or different. For example, all pages may simply be blank. In further embodiments, certain pages may have designated functions, such as calendar, task manager, file administration, program control, or other functions.

Interconnection between pages and circuitry (or circuitry for notebook 200 and circuitry within each page 100) may be accomplished through the binding of notebook 200, for example.

In other embodiments of notebook 200, the pages 100 may be removable, as in a conventional binder. Interconnectivity may be via dedicated ports on each page 100 so that a removed page may be used to upload/download data.

In another application, one or more tablets 100, as a single unit or in the form of the aforementioned book, may be operable coupled to integral or external memory devices. The user may store notes/sketches by software integral in a device controller. The software may be activated by suitable buttons on the device, a separate touch pad and or region of the surface 112 activated by pen 110, or integral on-screen software displayed on the electronic tablet 100, as is common in conventional PDAs. The software may operate to control storage, retrieval, and/or searching of the notes/sketches created by the strokes of pen 110.

Figure 18:
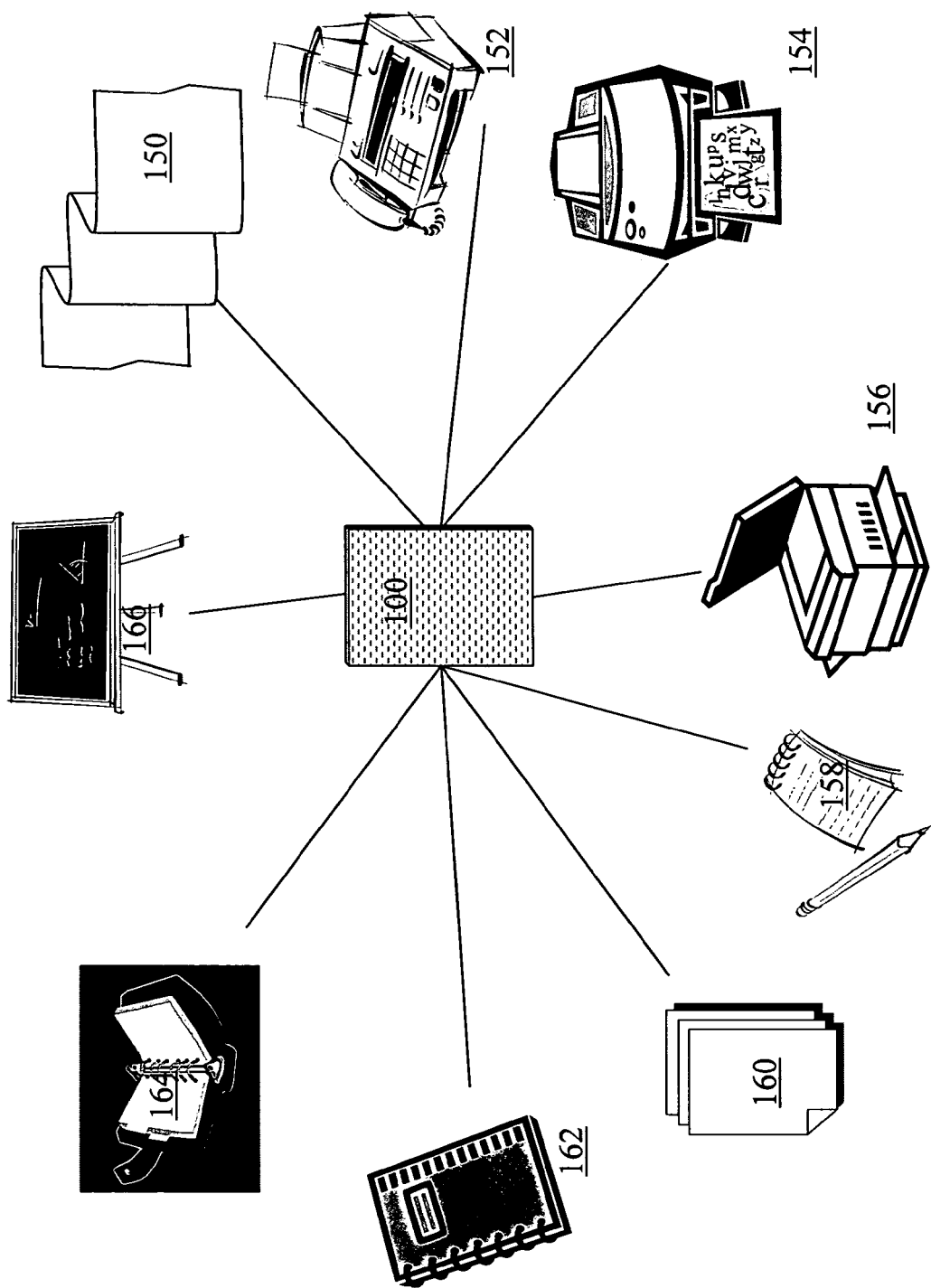
FIG. 18 shows a multitude of configurations of the electronic sheets according to the invention herein.

Referring to FIG. 18, the electronic writing sheets 100 may be employed in various writing, printing and display applications. For example, the electronic writing sheets 100 may be configured in the form of a flexible sheet 150 (wherein the thickness of the sheet should be less than, preferably substantially less then, the bending ratio of the material). Further, since the sheets 100 may be flexible similar to conventional paper, they may be faxed 152 or copied 156. Furthermore, printers 154, facsimile machines 152 and photocopiers 156 may be designed to "print" by applying voltages according to the teachings herein (e.g., wherein the printing heads of the printers 154, facsimile machines 152 and photocopiers 156 operate according to the principles of the pen hereinabove). The electronic writing sheets 100 may also be configured as notepads 158, multi-purpose sheets 160 (which may be in the form of a note sheet, letter-sized sheet, poster, or any other dimensional configuration), notebooks 162, or personal organizers 164 (or any other combination of presented material and blanks regions for "writing" data). Further, an electronic writing sheet 100 may be configured on a large scale, such as a blackboard 166 or a whiteboard.

While preferred embodiments have been shown and described, various modifications and substitutions may be made thereto without departing from the spirit and scope of the invention. Accordingly, it is to be understood that the present invention has been described by way of illustrations and not limitation.

The invention claimed is:

1. A system for electronic writing including:
    an electronic writing sheet including
        a contact layer including a substrate and an array of electrode conductors formed through the substrate, the contact layer having a first surface and a second surface, the electrode conductors having a first end at the first surface and a second end at the second surface;
    an optical layer coupled to the first ends of the electrode conductors,
    an electrode coupled to the optical layer;
    a voltage source coupled to the electrode;
    a circuit pen,
wherein resistance variants caused by contact between the circuit pen and the second end of an electrode conductor of the array of electrode conductors induce change in an optical property of the optical layer.

2. A system as in claim 1, wherein the contact layer is self supporting.

3. A system as in claim 1, wherein the contact layer is flexible.

4. A system as in claim 1, wherein the contact layer is flexible and self supporting.

5. An electronic notebook system comprising plural systems as in claim 1.

6. The electronic notebook system of claim 5, wherein each sheet is substantially the same.

7. The electronic notebook system of claim 5, wherein at least one sheet is different from at least one other sheet.

8. The electronic notebook system of claim 5, wherein at least one sheet includes pre-designated functions.

9. The electronic notebook system of claim 8, wherein said pre-designated function includes a calendar, a task manager, a software control system, or a file manager.

* * * * *